United States Patent
Burczyk et al.

(10) Patent No.: US 6,658,940 B2
(45) Date of Patent: Dec. 9, 2003

(54) PRESSURE SENSOR, AND A METHOD FOR MOUNTING IT

(75) Inventors: Dietfried Burczyk, Teltow (DE); Karl Flögel, Schopfheim (DE); Thomas Velten, Wehr (DE); Bernd Kastner, Schopfheim (DE); Wolfgang Woest, Rheinfelden (DE)

(73) Assignee: Endress + Hauser GmbH + Co., Maulburg (DE)

( * ) Notice: Subject to any disclaimer, the term of this patent is extended or adjusted under 35 U.S.C. 154(b) by 10 days.

(21) Appl. No.: 09/987,480

(22) Filed: Nov. 14, 2001

(65) Prior Publication Data

US 2002/0062696 A1 May 30, 2002

Related U.S. Application Data

(60) Provisional application No. 60/268,055, filed on Feb. 13, 2001.

(30) Foreign Application Priority Data

Nov. 15, 2000 (EP) ............................................ 00124299

(51) Int. Cl.[7] ................................................. G01L 7/08
(52) U.S. Cl. .............................. 73/715; 73/718; 73/706
(58) Field of Search ........................ 73/706, 715, 718, 73/708, 727, 756

(56) References Cited

U.S. PATENT DOCUMENTS 5,212,989 A * 5/1993 Kodama et al. .............. 73/706
2001/0015105 A1 * 8/2001 Gerst et al. .................... 73/715

* cited by examiner

Primary Examiner—Edward Lefkowitz
Assistant Examiner—Jermaine Jenkins
(74) Attorney, Agent, or Firm—Jones, Tullar & Cooper, P.C.

(57) ABSTRACT

A pressure sensor element for mounting in a connecting element comprises an isolator body with a laterally projecting membrane. The laterally projecting membrane covering an opening of a passage through which the pressure present at the surface of the membrane is conveyed to a pressure transducer element by means of a hydraulic fluid. In order to mount the pressure sensor element, it is secured in a mounting aperture of the connecting element. The projecting perimeter of the membrane is secured to the surface surrounding the mounting aperture of the connecting element by means of a continuous seam. A membrane type ring in combination with a conventional membrane may be substituted for the projecting membrane, wherein the membrane type ring covers the gap between the pressure sensor element and the adapter element.

17 Claims, 2 Drawing Sheets

PRESSURE SENSOR, AND A METHOD FOR MOUNTING IT

CROSS REFERENCE TO RELATED APPLICATION

This application is based on Provisional Application filed Feb. 13, 2001 as application No. 60/268,055.

FIELD OF THE INVENTION

The invention relates to absolute, relative and differential pressure sensors having a metal diaphragm facing the process. More specifically, the invention relates to a pressure sensor for mounting in a process connection.

A pressure sensor having a metal diaphragm facing the process comprises a housing with a passage whose process-side opening is closed by a metal diaphragm The deformation member of a pressure transducer is arranged at the opening, averted from the process, of the passage. The passage is filled with a transmission liquid which transmits the pressure present at the diaphragm to the deformation member of the pressure transducer, the pressure transducer generating a measuring signal owing to the pressure-induced deflection of the deformation member.

There are a multiplicity of variants of such pressure sensors with a metal diaphragm facing the process. The number of possible variants is yielded as the product of the number of process connections or connecting elements and the number of basic sensors or pressure sensor elements. The latter is given as the product of the number of measuring ranges and the number of process diaphragm materials, and the number of different transmission liquids.

Several thousand variants are easily yielded for a pressure sensor family. Storing all the variants is very complicated and expensive and is therefore to be avoided. To the extent that the number of process connections frequently constitutes the largest factor, an obvious approach is to prefabricate the pressure sensor elements of one family and keep them in store already calibrated. Depending on what is required, a pressure sensor element is then welded to an appropriate connecting element.

It turns out to be difficult in this case to connect the pressure sensor element reliably to the connecting element without putting the calibration at risk. As illustrated in FIG. 3, when the pressure sensor element 110 is being welded into the connecting element 140 the welding scam 150 must be designed to be solid and deep in order to withstand the process pressure and any instances of overload shock pressure.

This contradicts the requirement to configure the welding seam as thin and flat as possible so that no mechanical stresses are introduced into the active region of the process diaphragm 120, because only thus is it possible to dispense with renewed calibration of the pressure sensor element.

SUMMARY OF THE INVENTION

The object of the invention is to provide a pressure sensor element which can be welded in a connecting element without repercussions and without making compromises in the process with regard to pressure resistance or sensor performance.

The object according to the invention is achieved by a pressure sensor arrangement having: a pressure sensor element comprising a pressure transducer element for outputting a pressure-dependent signal; and an isolator member having a passage between a first opening in an end face of the isolator member which extends essentially perpendicular to the mounting direction of the pressure sensor element as far as its outer edge, and a second opening in a second surface of the isolator member, the pressure transducer element being connected to the passage through the second opening, a diaphragm which seals the first opening of the passage, and a transmission medium in the passage for the purpose of transmitting the pressure present at the diaphragm to the pressure transducer element, wherein the diaphragm extends laterally or radially outward beyond the outer edge of the end face of the isolator member; a connecting element with an opening in a surface for holding the pressure sensor element, the pressure sensor element being fixed in the opening in such a way that the end face of the isolator member lies in a plane with the edge region of the surface about the opening, the projecting region of the diaphragm being connected to the edge region of the surface along an inherently closed connecting seam about the opening; and a diaphragm ring with an inner edge region and an outer edge region, the inner edge region being fastened on the end face of the isolator member by means of an inherently closed seam of the isolator member and the outer edge region being fastened on the surface of the connecting element by means of an inherently closed seam about the opening. Further advantageous aspects of the invention follow from a consideration of the claims, the the description and the drawings.

The pressure sensor element according to the invention for mounting in a connecting element comprises:
a pressure transducer element for outputting a pressure-dependent signal; and a isolator member having a passage between a first opening in an end face of the isolator member which extends essentially perpendicular to the mounting direction of the pressure sensor element as far as its outer edge, and a second opening in a second surface of the isolator member, the pressure transducer element being connected to the passage via the second opening, and a diaphragm which seals the first opening of the passage, and a transmission medium in the passage, for the purpose of transmitting the pressure present at the diaphragm to the pressure transducer element, the diaphragm extending laterally beyond the outer edge of the end face of the isolator member.

In order to provide pressure sensor arrangements, the pressure sensor element according to the invention can be mounted in suitable connecting elements without repercussions, i.e. the calibration of the pressure sensor element is maintained during the mounting.

In a preferred embodiment, the basic sensor element is screwed into an opening in the connecting element, which is designed as a process connection. In this case, a gap can remain between the pressure sensor element or the isolator member of the pressure sensor element and the connecting element, and be covered by the diaphragm. The diaphragm is then fastened along its outer edge on the connecting element.

The fastening is preferably designed as an inherently closed connecting seam, in particular as a welding seam, but it is also possible to provide soldering seams or bonding seams.

The seam need not transmit the total pressure force present at the opening if the sensor element is fixed in the opening of the connecting element and the diaphragm region enclosed by the connecting seam is sufficiently elastic.

It is therefore possible for the fastening, for example by welding, to be of a weak enough design that the calibration of the pressure sensor element is maintained.

In a further aspect, the solution according to the invention is modified to the effect that instead of a pressure sensor element with a projecting diaphragm a pressure sensor element with a conventional diaphragm whose circumference runs completely on the end face of the isolator member. In this case, an additional diaphragm ring is provided however. The pressure sensor element is arranged in an opening in a mounting surface of a connecting element, and the diaphragm ring is fastened on the one hand with the aid of an inherently closed seam of the isolator member on the end face of the isolator member and, on the other hand, with the aid of an inherently closed connecting seam about the opening on the mounting surface.

In order to fix the pressure sensor element, it is generally self-closed, force-closed or friction-closed connections between the isolator member and the connecting element which are suitable, self-closed connections being preferred.

In order to fix the pressure sensor element, it is generally self-closed, force-closed or friction-closed connections between the isolator member and the connecting element which are suitable, self-closed connections being preferred.

DESCRIPTION OF THE PREFERRED EMBODIMENTS

Figure 1:
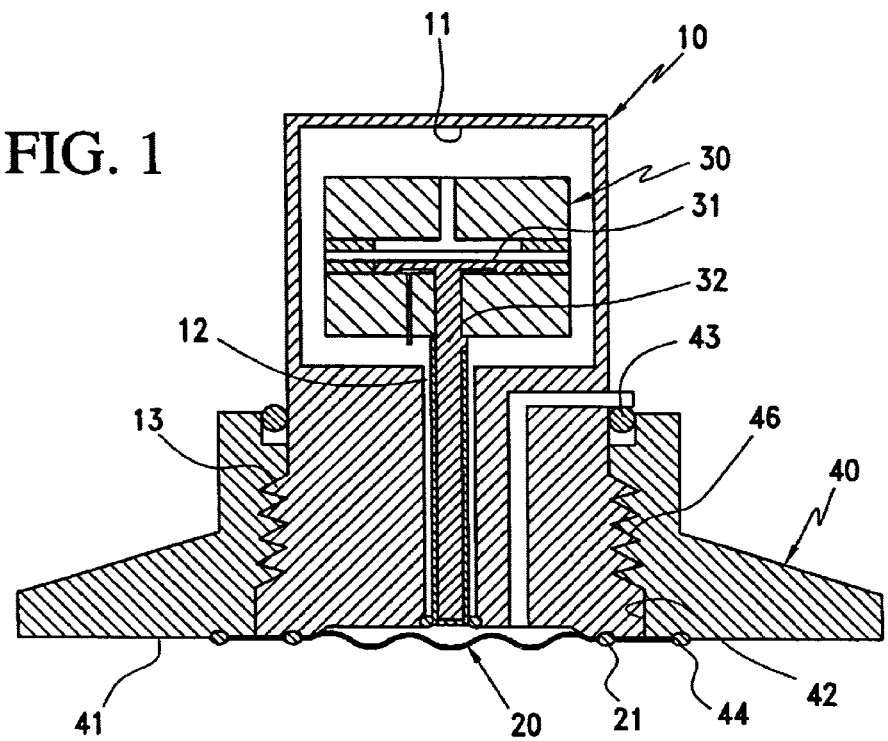
FIG. 1 shows a longitudinal section through an embodiment of the pressure sensor arrangement according to the invention.

The pressure sensor element according to the invention shown in FIG. 1 comprises a pressure transducer 30 and an isolator member 10 which separates the pressure transducer 30 from the process medium which makes contact with the diaphragm 20 of the isolator member. The diaphragm is fastened on the end face of the isolator member along an inherently closed seam 21 of the isolator member, which seam seals an opening, on the end-face side, of a passage 12, arranged in the isolator member 10, against the process medium. The passage 12 has a second opening in a second surface of the isolator member, at which the pressure transducer 30 is connected to the passage 12. The passage 12 is filled with a transmission liquid 32.

The isolator member 10 is provided with teeth 46 for securing the isolator member 10 to a connecting element 40.

During operation of the pressure sensor element, the diaphragm 20 is deformed owing to the pressure which is present, and the resulting change in volume an the end-face side is transmitted by means of the transmission fluid 32 to the pressure transducer element 30, which has a deformation member 31 which picks up the change in volume. The measuring signal is then generated by the pressure transducer element 30 as a function of the deflection of the deformation member 31.

Capacitive transducers, or transducers with deformation-dependent electric resistances are particularly preferred for use as pressure transducer element 30.

Figure 2:
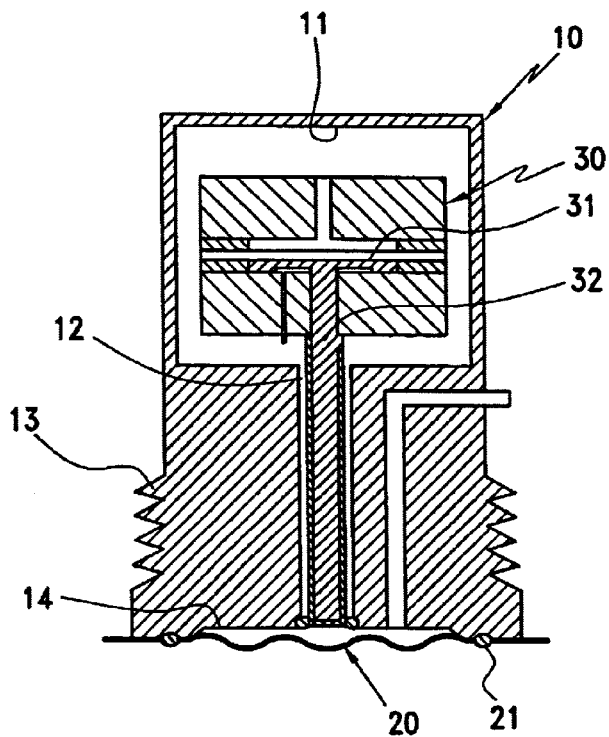
FIG. 2 shows a longitudinal section through an embodiment of the pressure sensor element according to the invention.
Figure 3:
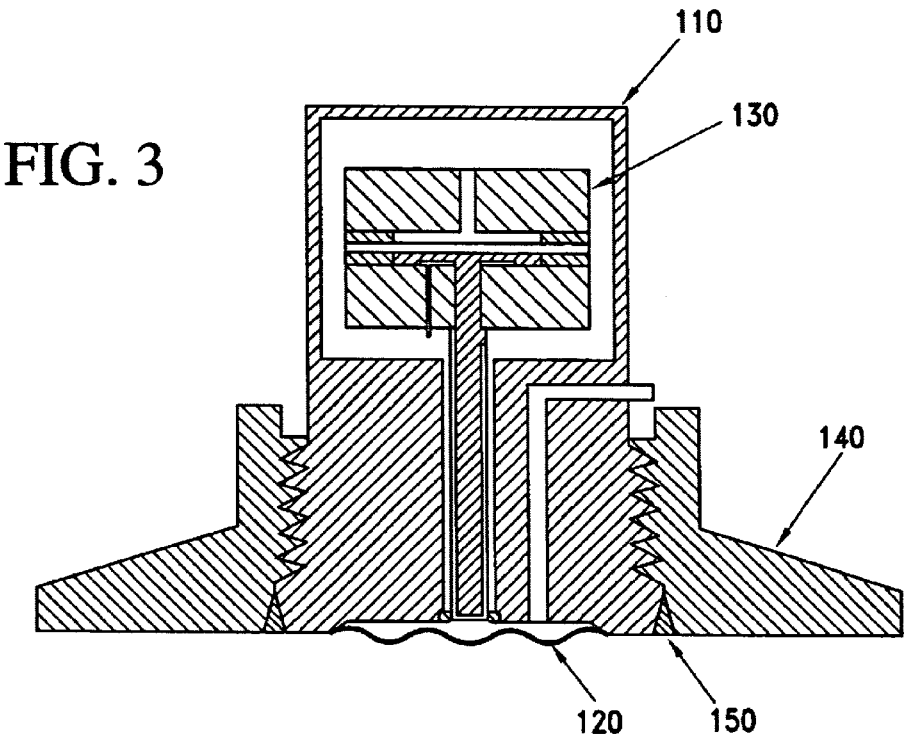
FIG. 3 shows a longitudinal section through a pressure sensor arrangement according to the prior art.

In the embodiment shown in FIG. 2, the pressure transducer element 30 is enclosed in a housing 11 which is integrated into the isolator member, but in principle any other type of mounting of the pressure transducer element 30 is possible without departing from the teaching of this invention.

In the pressure sensor element in accordance with FIG. 2, the end face of the isolator member 10 has a cutout 14 in order to provide a sufficiently large pressure-dependent volume between the diaphragm and the end face. The cutout 14 is provided is provided in the figure with an essentially flat bottom. However, the bottom of the cutout 14 can likewise have a wave pattern which runs parallel to the wave structure of the diaphragm. In this way, the mean distance between the diaphragm and the bottom of the cutout 14 can be reduced, thus minimizing the volume of the transmission liquid between the cutout 14 and the diaphragm.

In an alternative to this, the diaphragm can rise in a lightly cambered fashion above an essentially flat end face.

According to the invention, the diaphragm 20 extends laterally beyond the outer edge of the end face of the isolator member 10, doing so, specifically, to such an extent that after the mounting of the pressure sensor element in a connecting element 40 the diaphragm covers a gap, possibly remaining, between the pressure sensor element and the connecting element 40 and can be fastened on the bordering surface 41 of the connecting element, as shown in FIG. 1. The fastening is preferably performed by means of an inherently closed connecting seam 44, which is designed as a welding seam soldering seam or bonding seam.

In accordance with another embodiment, compensating means are provided in the diaphragm between the seam 21 of the isolator member and the joining seal 44 in order to compensate stresses which possibly occur when the connecting seam is designed as a welding seam. At least one inherently closed raised line or reinforcing fin which completely surrounds the seam of the isolator member can be selected as compensating means. The raised line or reinforcing fin is preferably situated in the edge region of the diaphragm, which projects beyond the outer rim of the end face of the isolator member 10.

The pressure sensor element according to the invention can be calibrated, that is to say its characteristics can be fixed and set before mounting in a connecting element is performec. This calibration is not impaired by the subsequent mounting of the pressure sensor element in a connecting element, since the connecting seam 44 need seal only the gap between the isolator member 10 and the opening 42, and can to this extent be of a weak design Consequently, only relatively little thermal energy need be applied to construct the connecting seam 44 as a welding connection. In addition, the gap between the end face of the isolator member 10 and the surrounding surface 41 of the connecting element 40 contributes to the fact that any stresses occurring in the vicinity of the connecting seam 44 are largely isolated from the isolator member 10.

The isolator member 10 illustrated in FIG. 1 preferably has a cylindrical cross section and exhibits on its lateral surface a thread 13 for screwing into the opening 42 in a connecting element 40. A stop (not shown here) is provided in one embodiment, the position of the pressure sensor element being fixed thereby. Such a stop can be implemented, for example, by complementary axial shoulder surfaces on the isolator member 10 and in the opening 42. As FIG. 1 shows, prevention of rotation can also be achieved by a welded, soldered or bonded connection 43 between the pressure sensor element and the connecting element. It is to be borne in mind in this case that a welded connection is to be designed in a fashion as far removed as possible from the end face of the isolator member, for example between the end region, averted from the and face, of the lateral surface of the isolator member 10 and the inner wall of the opening 42.

Apart from threads which prevent rotation, there are also other self-closed or force-closed connections which are suitable for fixing the position of the pressure sensor element in the connecting element.

To the extent that the diaphragm 21 is frequently a thin metal diaphragm, it is to be recommended to protect the projecting edge region of the diaphragm during storage of the pressure sensor elements or when mounting them. Suitable for this purpose, inter alias is a auction adapter which is held on the diaphragm by underpressure. Given appropriate configuration, this adapter is suitable as a tool for mounting the pressure sensor element. The suction adapter can be removed from the diaphragm by ventilation without applying force, for example after mounting.

Figure 4:
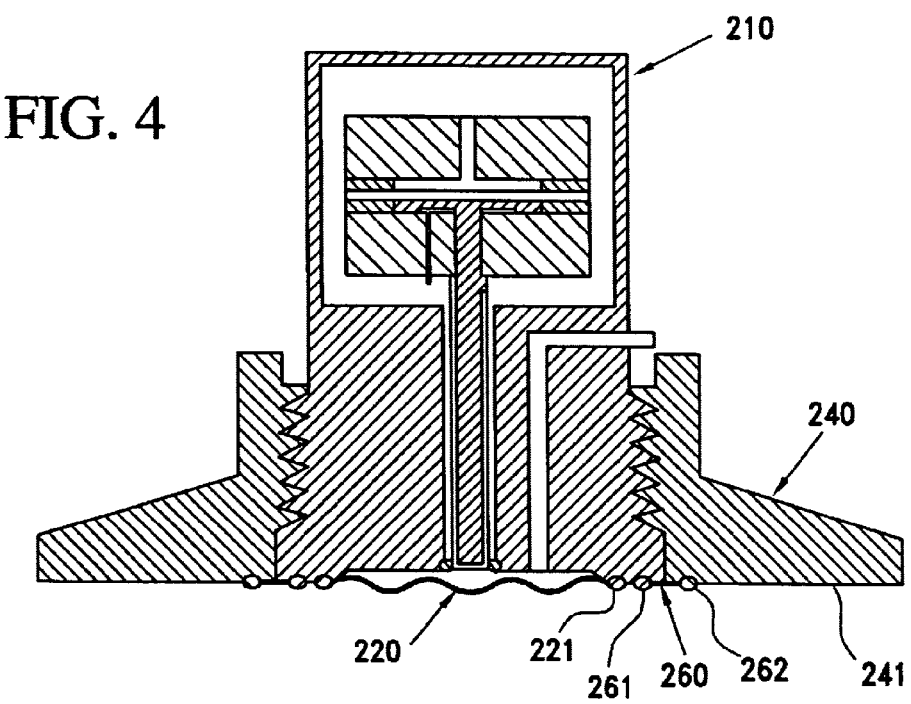
FIG. 4 shows a longitudinal section through an alternative embodiment of the pressure sensor arrangement according to the invention.

As an alternative to a pressure sensor element with a projecting diaphragm, a conventional pressure sensor element in combination with a diaphragm ring is suitable for implementing the invention. An appropriate embodiment is shown in FIG. 4. In this embodiment, the pressure sensor element is screwed with the isolator member 210 into an opening in the surface 241 of a connecting element 240. The isolator member 210 has a diaphragm 220 whose outer edge runs completely on the end face of the isolator member, and is sealed by an inherently closed seam 221 to the end face of the isolator member. Provided for sealing the gap between the surface 241 of the connecting element 240 and the end face of the isolator member is a diaphragm 260 which is fastened on the end face of the isolator member with the aid of an inherently closed seam 261 of the isolator member, and is fastened on the surface 241 of the connecting element 240 with the aid of an inherently closed connecting seam 262.

To the extent that the diaphragm ring is elastic and has to transmit only small forces, the loading of the connecting seam or the transport seam is likewise low. However, both seams can be of correspondingly small dimensions. It is thereby possible to design the se as welding seam without impairing the calibration of the pressure sensor element.

The embodiment with a diaphragm ring which has just been described on the one hand simplifies the handling of the pressure sensor element before mounting, since no sensitive projecting diaphragm is present, and an the other hand, given appropriate configuration of the lateral surface of the isolator member, the pressure sensor element can be screwed from the side averted from the process into the mounting opening of a connecting element.

What is claimed is:

1. A pressure sensor element for mounting in a connecting element, comprising:
    a pressure transducer element for outputting a pressure-dependent signal; and
    an isolator member, said isolator member having:
        an end face, an outer edge defined by said end face, a first opening in said end face, a second surface, a second opening in said second surface, a passage extending perpendicular to the mounting direction of the pressure sensor element from said first opening to said second opening, said pressure transducer element being connected to said passage though said second opening, a diaphragm which seals said first opening, said diaphragm extends radially outward beyond said outer edge of said end face, and a transmission medium in said passage for the purpose of transmitting the pressure present at said diaphragm to said pressure transducer element.

2. The pressure sensor element as defined in claim 1, wherein said isolator member further having: an axially symmetrical lateral surface with reference to the mounting direction.

3. The pressure sensor as defined in claim 1, wherein said diaphragm is a metal diaphragm.

4. A pressure sensor element for mounting in a connecting element, comprising:
    a pressure transducer element for outputting a pressure-dependent signal;
    an isolator member, said isolator member having:
        an end face, an outer edge defined by said end face, a first opening in said end face, a second surface, a second opening in said second surface, a passage extending perpendicular to the mounting direction of the pressure sensor element from said first opening to said second opening, said pressure transducer element being connected to said passage through said second opening, a diaphragm which seals said first opening, said diaphragm extends radially outward beyond said outer edge of said end face, and a transmission medium in said passage for the purpose of transmitting the pressure present at said diaphragm to said pressure transducer element; and
    a pressure sensor element, wherein said diaphragm is connected to said end face along an inherently closed seam of said isolator member.

5. The pressure sensor as defined in claim 4, wherein said inherently closed seam comprises one of: a welding seam, a soldering seam and a bonding seam.

6. The pressure sensor as defined in claim 4, wherein said isolator member further has a cutout defined by said end face, which cutout is completely enclosed by said inherently closed seam.

7. The pressure sensor as defined in claim 4, wherein outwardly of said inherently closed seam, said diaphragm has at least one of: an inherently closed reinforcing fin, a groove and a bulge which surrounds said inherently closed seam.

8. A pressure sensor arrangement, comprising:
    a pressure sensor element having: a pressure transducer; and an isolator member; said isolator member having an end face; and
    a connecting element defining a surface with an edge region and an opening extending from said surface, wherein:
        said pressure sensor element being fixed in said opening in such a way that said end face lies in a plane with said edge region and about said opening,
        a projecting region of said diaphragm is connected to said edge region along an inherently closed connecting seam about said opening.

9. The pressure sensor arrangement as defined in claim 8, wherein said connecting seam comprises one of: a welding seam, a soldering seam and an adhesive seam.

10. The pressure sensor arrangement as defined in claim 8, wherein:
    said opening defines an inner wall and said isolator member defines a lateral surface, both of which have threads which are mutually complementary threads.

11. The pressure sensor arrangement as defined in claim 8, further comprising:
    at least one anti-rotation means which prevents rotation of the mounted pressure sensor in said opening.

12. The pressure sensor arrangement as defined in claim 8, further comprising:

at least one welded connection between said pressure sensor element and said connecting element, said welded connection being located in a section of said opening remote from said end face.

13. A pressure sensor arrangement, comprising:

a pressure sensor element, having: a pressure transducer element for outputting a pressure-dependent signal; and an isolator member, said isolator member having: an end face, an outer edge defined by said end face, a first opening in said end face, a second surface, a second opening in said second surface, a passage extending from said first opening to said second opening, said pressure transducer element being connected to said passage through said second opening, a diaphragm fastened on said end face along an inherently closed seam, said diaphragm sealing said first opening, and a transmission medium in said passage for the purpose of transmitting the pressure present at said diaphragm to said pressure transducer element;

a connecting element defining a surface and an opening extending from said surface of said connecting element for holding said pressure sensor element; and a diaphragm ring defining an inner edge region and an outer edge region, wherein:

said pressure sensor element is fixed in said opening of said connecting element in such a way that said end face lies in a plane with said edge region and about said opening, and said inner edge region of said diaphragm ring is fastened on said end face by means of an inherently closed seam and said outer region being fastened on said surface of said connecting element by means of an inherently closed seam and about said opening.

14. The pressure sensor arrangement as defined in claim 13, wherein said diaphragm ring is made of the same material as said diaphragm.

15. A method for mounting a pressure sensor element to a connecting element, the pressure sensor element having an isolator member defining an end face and an outer edge of the end face, and a diaphragm arranged on the end face of the isolator member which extends radially outward beyond the outer edge of the end face, comprising the steps of:

inserting the pressure sensor element into an opening in the connecting element such that the end face of the isolator member and the surface of the connecting element in the region of the connecting element surrounding the opening lie in the same plane; and fastening the diaphragm to the surface of the connecting element in the region of the connecting element surrounding the opening by an inherently closed seam surrounding the opening.

16. The method as defined in claim 15, wherein the seam is formed by one of: welding, soldering and bonding with an adhesive.

17. The method as defined in claim 15, further comprising the steps of:

precalibrating the pressure sensor element; and mounting the precalibrated pressure sensor element such that said precalibration is maintained.

* * * * *